United States Patent [19]
Garfinkle

[11] Patent Number: 5,530,754
[45] Date of Patent: Jun. 25, 1996

[54] VIDEO ON DEMAND

[76] Inventor: Norton Garfinkle, 2800 S. Ocean Blvd., Boca Raton, Fla. 33432

[21] Appl. No.: 285,033

[22] Filed: Aug. 2, 1994

[51] Int. Cl.⁶ .................................................. H04N 7/167
[52] U.S. Cl. ................................................ 380/5; 380/70
[58] Field of Search ...................... 380/5, 10, 20

[56] References Cited

U.S. PATENT DOCUMENTS

| | | |
|---|---|---|
| 4,358,672 | 11/1982 | Hyatt et al. . |
| 4,506,387 | 3/1985 | Walter . |
| 4,593,337 | 6/1986 | Leone et al. . |
| 4,890,320 | 12/1989 | Monslow et al. . |
| 4,945,563 | 7/1990 | Horton et al. . |
| 4,947,429 | 8/1990 | Bestler et al. . |
| 5,046,090 | 9/1991 | Walker et al. . |
| 5,051,822 | 9/1991 | Rhoades . |
| 5,060,079 | 10/1991 | Rufus-Isaacs . |
| 5,070,400 | 12/1991 | Lieberman . |
| 5,081,680 | 1/1992 | Bennett . |
| 5,291,554 | 3/1994 | Morales . |

*Primary Examiner*—David C. Cain
*Attorney, Agent, or Firm*—Lane, Aitken & McCann

[57] ABSTRACT

A video-on-demand system in which catalog data is periodically transferred to the user sites, where it is stored. This catalog data includes listings of the video products available at the central station, so-called trailers or previews for certain of the video products, and lead-ins for the initial portions of certain products to provide a seamless lead in to program material ordered from the central station. In a preferred embodiment of the invention, menu driven software allows a user to control the display of catalog data and to order video products from the central station interactively with displayed catalog material.

5 Claims, 3 Drawing Sheets

VIDEO ON DEMAND

BACKGROUND OF THE INVENTION

FIELD OF THE INVENTION

This invention relates to an improved video-on-demand system, and more particularly to a system that provides a user interface for the products available from a remote central station.

DESCRIPTION OF THE PRIOR ART

Video-on-demand systems of the type contemplated by this invention allow users to order video products from a central station. The video product (e.g., a movie, business report, other text or numerical reports, video game, etc.) is downloaded from the central station to the user site and stored in a suitable memory at this site. My copending application, Ser. No. 08/072,917, filed Jun. 7, 1993, discloses such a video-on-demand system, including means to limit the use of the downloaded product. This copending application is incorporated herein by reference.

In proposed video-on-demand systems, the link between the central station and the user may be any of a number of suitable links, such as a telephone company copper wire link, a local area network (LAN) of personal computers, a radio frequency wireless communications link, a coaxial cable, an optical fiber, or other link technology. U.S. Pat. No. 5,291,554 to Morales discloses a system in which video products are distributed from a program store and process center over a two-way interactive wireless satellite network. A video product is advantageously downloaded as a compressed digital data stream transmitted at a rate which is optimized in terms of transfer rate to the bandwidth capacity of the link. The downloaded product is preferably stored in a compressed digital data format and decompressed as it is read from storage and converted from a digital format to a format compatible with the user's viewing device, such as a CRT.

Even with data compression, a sizable memory is required at the user site to store even a single video product, such as a movie. Therefore, it is practical only to store one or at most a few video products at the user site at any given time. A need arises, therefore, to provide a user interface to the large number of video products available at the central station without the need for a relatively costly two-way wireless, interactive satellite network.

SUMMARY OF THE INVENTION

One object of this invention is the provision of a video-on-demand system that provides access at the user site to catalog data of the video products available from the central station.

Another object of this invention is the provision of a video-on-demand system with an interactive user display that provides the user with a menu of options to assist him or her in identifying, previewing, and ordering a video product from the central station library.

Another object of the invention is the provision of a video-on-demand system that can allow the user to start viewing a product at the time it is ordered from the central station, eliminating the hiatus created by the time consumed in the downloading process.

Briefly, this invention contemplates the provision of an improved video-on-demand system in which catalog data is periodically transferred to the user sites, where it is stored. This catalog data includes listings of the video products available at the central station, so-called trailers or previews for certain of the video products, and leadins for the initial portions of certain products to provide a seamless lead in to program material ordered from the central station. In a preferred embodiment of the invention, menu driven software allows a user to control the display of catalog data and to order video products from the central station interactively with displayed catalog material.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
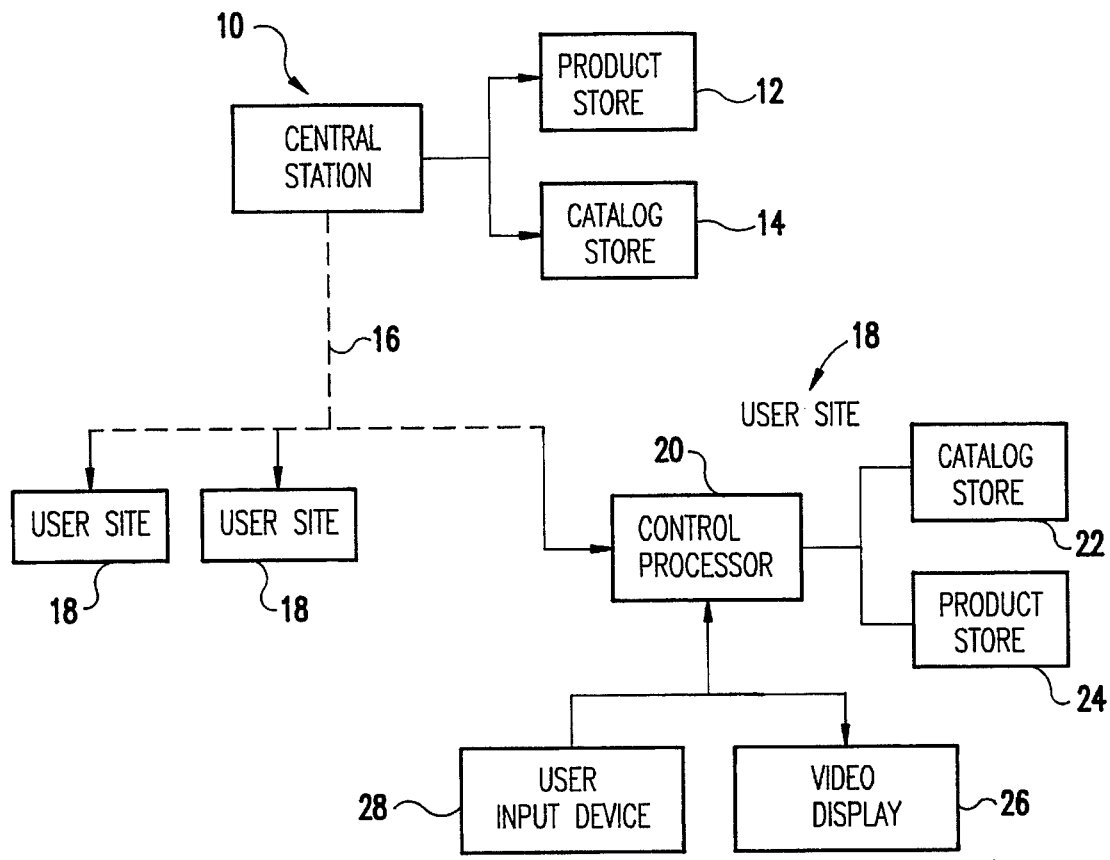
FIG. 1 is a block diagram of one embodiment of a video-on-demand system in accordance with the teachings of this invention.

Referring now to FIG. 1, a video-on-demand system in accordance with the teachings of this invention has a central station indicated by the general reference numeral 10 which includes an inventory of video products stored, preferably although not necessarily, in compressed digital data form, in a product store memory 12. In addition, the central station 10 has a digital data bank 14 in which is stored catalog information identifying the video products available in product store 12 and certain materials related to these products. As will be appreciated by those skilled in the art, the memories 12 and 14 may be parts of a single physical memory system, although functionally separate. Alternatively, the memories 12 and 14 may be physically separate memories. Further, the memory 14 may be located remotely from the central station 10 and the catalog information stored therein transferred by physically distributing a CD-ROM to users rather than transferring catalog information by means of a data link connecting the central station and users.

In this specific embodiment of the invention, a suitable data link indicated by the dash line 16 connects the central station 10 to a plurality of user sites 18. The link 16 may be copper wire of the type used by the telephone company, a radio frequency wireless communications link of the type used in satellite-to-earth communications, a coaxial cable, a fiber optic cable, cellular wireless or other suitable link, such as a local area network interconnecting personal computers and work stations at the user sites and the processor at the central station. Preferably, data is downloaded from the central station to the user sites in a compressed digital data stream at a transmission rate that is selected to optimize the data transmission rate for a given bandwidth capacity of the link and minimize transmission time consistent with transmitting a signal of acceptable quality.

Each user site includes a control processor 20, a catalog store 22 and a product store 24. In this embodiment of the invention, catalog data is downloaded periodically from the central station 10 to each of the user sites 18. At each user site, the control processor 20 directs downloaded catalog data to the catalog store memory 22. Video products are downloaded by the central station from the product store 12 to a selected user site 18 in response to a download request from that particular user site. The downloaded video product data is stored at the user site in the product store 24. Again, as will be appreciate by those skilled in the art, the catalog store and product store may physically reside in a single digital memory that is functionally addressable as catalog store memory space and product store memory space.

The control processor 20 couples the catalog store 22 memory and product store 24 memory to a video display 26, such as a CRT video display or a LCD video display. Assuming the product and catalog data is stored in a compressed data format in memories 24 and 22, respectively, the control processor includes the necessary software and hardware to perform a decompression function. A user input device 28 interacts with the catalog data and a menu presented on the video display to allow the user to use the catalog data stored in catalog store 22 to, in some cases, preview video products available from the central station 10, and to order any available video product in the catalog store.

Figure 2:
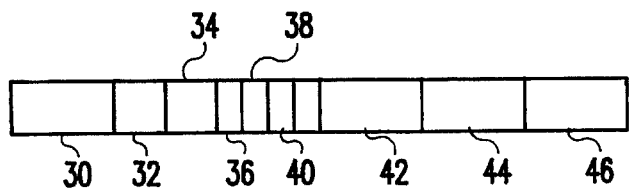
FIG. 2 is a drawing illustrating exemplary fields in a typical catalog entry.

Referring now to FIG. 2, it illustrates one particular embodiment of the data fields stored in the catalog store 14 for each video product and periodically downloaded for each of the video products available from the central station. This data may include a field 30 with the name of the product, such as the title of a movie which may also serve as an address of the video product in product store 12. A field 32 may include, for example, the price for a one-time viewing of the product and a field 34 might include catalog search keys, such as the names of the principal actors and actresses, the type of video product (e.g., educational, movie, etc.), and the type of movie (e.g., drama, romance, comedy, etc.). Fields 36, 38 and 40 may include flags to indicate whether a critique of this product is available in the catalog store, whether a lead-in is available and whether a trailer is available. If any of these flags are set, fields 42, 44 and 46 can be used to address the appropriate materials in the catalog store 22.

Figure 3:
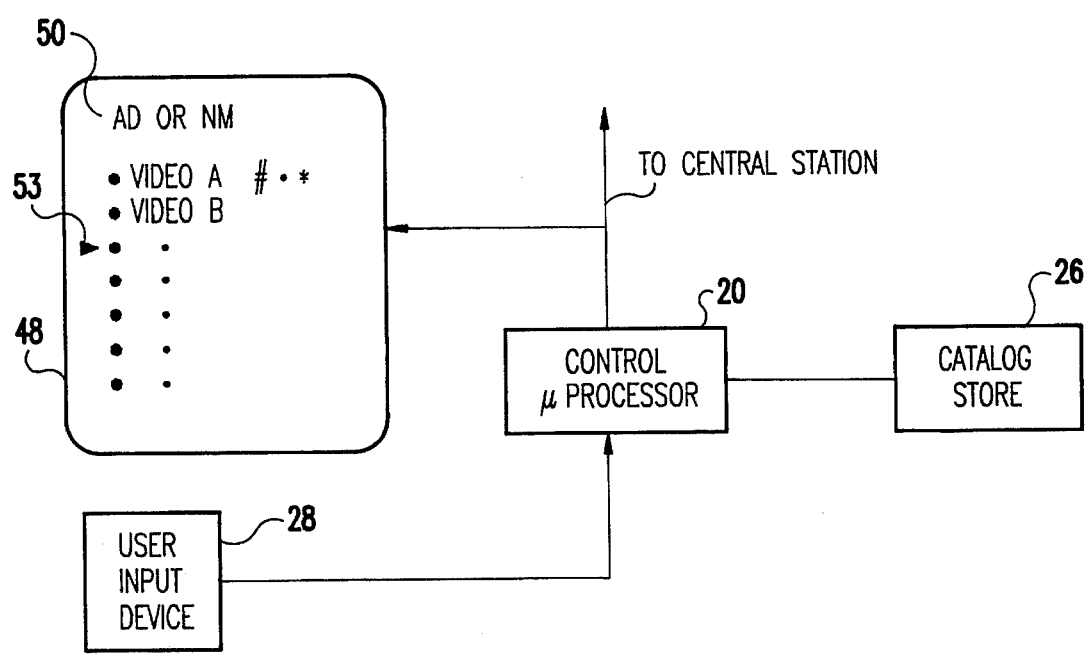
FIG. 3 is in part a block diagram and in part a pictorial diagram, illustrating certain aspects of the user interface to the video-on-demand system in accordance with the teachings of this invention.

Referring now to FIG. 3, in this exemplary embodiment of the invention, the controller 20 is a suitably programmed microprocessor with a mouse-type user input device 28, such as a commercially available mouse, remote TV control, or keyboard. The display screen 48 of the video display 26 can be used to display, under control of the microprocessor 20, menus 50 which assist the user in accessing the catalog store and ordering desired video products, as well as various listings of the available video products designated here as video A, video B, etc. Along with the listing of the video products, conveniently an indication can be made as to whether or not the catalog store 22 includes for the product a trailer, a lead-in, a critic's review, or the like. A cursor 53 can be manipulated by the user via the input device 28 to command the microprocessor 20 to address and fetch from the catalog store 26 the material called for by means of the cursor 53. The user can also order a desired video product by pointing with the cursor to the desired product and entering an appropriate command, such as a "click" with a mouse type input. The microprocessor 20 will transmit via a modem, for example, connected to the link 16 the appropriate identification data of the desired product to the central station along with a site identifier for billing purposes and as a download address. Alternatively, the user may order the video product by means of a conventional hand-wired or cellular dial-up phone link and enter the catalog displayed data by means of the telephone key tone generators. It will be appreciated that due to storage limitations, only certain of the video products will include trailers, for example the ten most popular new releases in the central station store.

Figure 4:
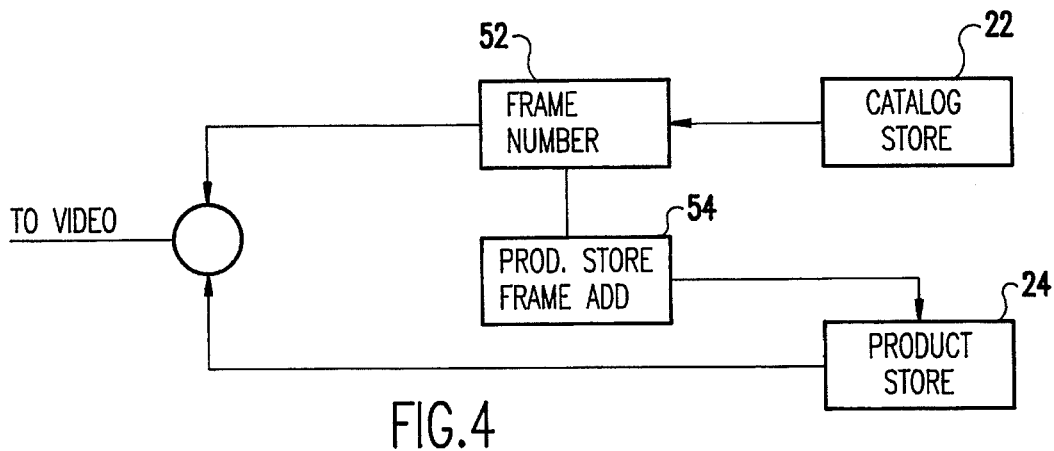
FIG. 4 is a functional block diagram, showing one specific embodiment of seamless splicing of site resident lead-in program material with newly downloaded program material.

Referring now to FIG. 4, for products that include a lead-in, as soon as the user selects the product (i.e., before the product is downloaded from the central station) the microprocessor 20, using the address associated with the selected product, will address and fetch the lead-in. This enables the display of the product (e.g., movie) to start almost immediately. The lead-in is an initial segment of the video product sufficient in length to allow the downloading of the selected product to the user site. For example, the lead-in segment may be on the order of two minutes long. In order to provide a seamless transition or splice from the catalog stored lead-in material to the full video program stored material downloaded to product store 24 can be made through frame matching. The frames in the catalog store lead-in can be numbered and the initial frames in the downloaded video product can be suitably identified by means, for example, of operating data, such as frame count, program material identification, etc., encoded in the vertical blanking interval for the CRT display. The material is read out, decompressed and coupled to a frame monitor 52. This frame number is converted in block 54 to an address of the starting point of the video product in product store 24.

Figure 5:
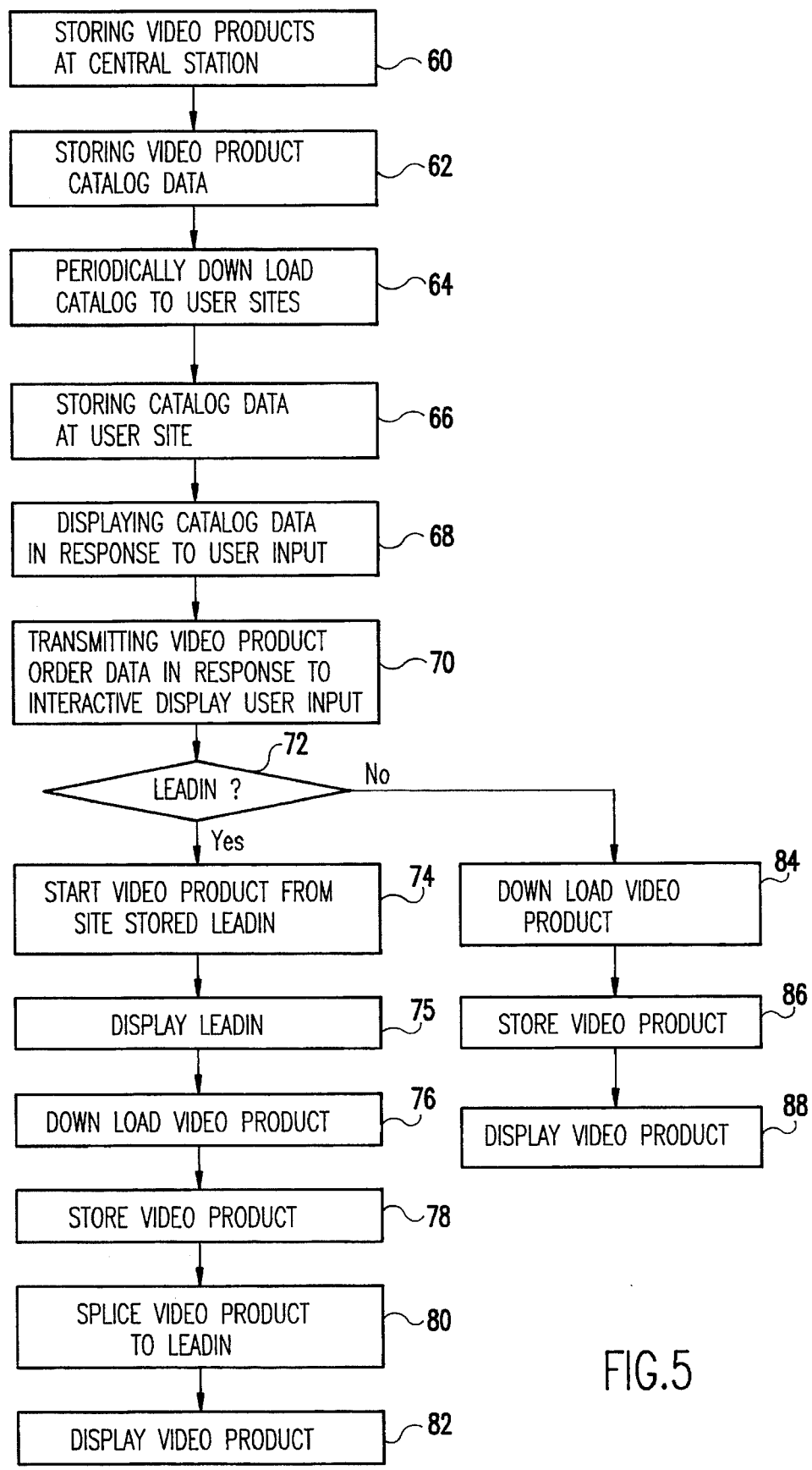
FIG. 5 is a flow diagram of the operational steps of the video-on-demand system in accordance with this invention.

The operation of the video demand system in accordance with the teachings of this invention is illustrated in FIG. 5. A large number of video products are digitized and stored in the central station product store 12, as indicated in function box 60. For each of the video products in product store 12, catalog data is prepared and stored in central station catalog store 14. This catalog data includes, for example, the product name, its address in the product store 12, its price, and for certain video products related material such as a trailer to allow the user to preview the product, a header to allow immediate viewing of an ordered product, critical comments relative to the product, and catalog search keys.

As illustrated in function block 64, the catalog data is periodically downloaded to each of the user sites 18 where it is stored in the user site catalog store 22, block 66.

The display of the catalog data is controlled by the user via an appropriate input device, such as a so-called mouse, block 68. Such displays may include a listing of video products by category, e.g., drama, comedy, etc., or type movie or educational course material. Further, the user for certain video products can call up additional information, such as a critique of the material or a trailer that allows him to preview the video product.

Using the interactive video display and the catalog material, the user transmits video product order data to the central station in block 70. This order data would include, in addition to data from which the product can be addressed in the central station product store 12, data relating to the user to allow the central station to download the ordered video product to the user and to bill the user.

Decision block 72 asks whether or not the selected video product has a lead-in stored in the site catalog store 22. If it does, the control processor starts the display of the ordered video product from the lead-in material stored at the site in catalog store 22, block 74. Upon receipt of the transmitted order for a video product, the central station retrieves the product from product store 12 and transmits it, preferably as a compressed digital data stream, to the ordering site 18 where it is stored in the site's product store 24, blocks 76 and 78. The complete video product stored in product store 24 is spliced to the lead-in from catalog store 22 in block 80.

If the outcome of decision block 72 is no (i.e., there is no lead-in associated with the product), the ordered product is downloaded to the user site 18, stored in the video product memory 24 and displayed on the video display 26, as indicated in blocks 84, 86 and 88. On the transmission of requested program material, a variant is that the central station could monitor how much storage is available at the user site's product store and transmit on the first transmission only as much as can be stored. Subsequently, the central computer could calculate run-times for the product at the user's site and at the point at which only a predetermined number of minutes of program material should remain unused, it could transmit the next block of data.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A video-on-demand method comprising the steps of:
    storing a plurality of video products in digital form at a central station;
    storing, in digital form, descriptive data for each of said plurality of video products stored at said central station, said descriptive data including a leader comprised of an initial segment of certain of said plurality of video display products;
    periodically transferring said digital descriptive data to each of a plurality of user sites;
    storing at each of said sites said descriptive digital data transferred in said periodic transferring step;
    displaying said digital descriptive data on a display terminal at said user site;
    transmitting from said user site to said central station data to order a video product in response to said digital descriptive data displayed in said displaying step;
    downloading to a user site from said central station a video product in response to said data to order a video product transmitted in said transmitting step;
    displaying said leader for a video display product while said video display product is downloaded to a user site;
    storing said downloaded video product at said user site; and
    displaying said video product stored at said user site starting from where said leader ends.

2. The video-on-demand method as in claim 1 wherein said video products, and said digital descriptive data are transmitted to a user site as a compressed digital data stream.

3. The video-on-demand method as in claim 1 wherein said digital descriptive data includes a trailer with scenes from certain of said plurality of video products.

4. The video-on-demand method as in claim 2 wherein said digital descriptive data includes a plurality of digital fields including fields identifying a video product, providing ordering data, and providing address of additional descriptive data.

5. The video-on-demand method as in claim 3 wherein said digital descriptive data includes a plurality of digital fields including fields identifying a video product, providing ordering data, and providing address of additional descriptive data.

* * * * *